US012650149B2

(12) United States Patent
Newcomb et al.

(10) Patent No.: US 12,650,149 B2
(45) Date of Patent: Jun. 9, 2026

(54) SEGMENTED BEARING CARTRIDGE WITH LOCAL AND CONTROLLED THERMAL EXPANSION

(71) Applicant: GM GLOBAL TECHNOLOGY OPERATIONS LLC, Detroit, MI (US)

(72) Inventors: Bradley Allen Newcomb, Troy, MI (US); Jeffrey Norman Heaton, White Lake, MI (US); Rodney James Campbell, Grand Blanc, MI (US); Sean Robert Wagner, Shelby Township, MI (US); Gerald Leonard O'Neil, Essex (CA); David S. Schulz, Livonia, MI (US); Erik Brandon Golm, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 18/403,256

(22) Filed: Jan. 3, 2024

(65) Prior Publication Data

US 2025/0215928 A1 Jul. 3, 2025

(51) Int. Cl.
*F16C 35/077* (2006.01)
*F16C 19/52* (2006.01)
*F16C 33/12* (2006.01)

(52) U.S. Cl.
CPC .......... *F16C 35/077* (2013.01); *F16C 19/525* (2013.01); *F16C 33/12* (2013.01); *F16C 2208/04* (2013.01)

(58) Field of Classification Search
CPC ...... F16C 19/525; F16C 33/12; F16C 35/077; F16C 2208/04
See application file for complete search history.

(56) References Cited

U.S. PATENT DOCUMENTS

| | | | |
|---|---|---|---|
| 10,280,974 B2 | 5/2019 | Newcomb et al. | |
| 10,637,321 B1 | 4/2020 | Newcomb et al. | |
| (Continued) | | | |

FOREIGN PATENT DOCUMENTS

| | | |
|---|---|---|
| DE | 69616906 T2 | 8/2002 |
| DE | 112004002295 T5 | 9/2006 |
| (Continued) | | |

OTHER PUBLICATIONS

Machine Translation of WO-2011020464-A1 (Year: 2011).*

(Continued)

*Primary Examiner* — Alan B Waits

(57) ABSTRACT

A bearing interface assembly configured to accommodate different rates of thermal expansion of a bearing and a housing of an installation site. The bearing interface assembly includes: a metallic sleeve including an outer surface defining a groove and an inner surface defining an aperture configured to cooperate with the bearing, the metallic sleeve configured to expand at a first coefficient of thermal expansion; and a filament-wound composite overwrap seated within the groove of the metallic sleeve, the filament-wound composite overwrap configured to expand at a second coefficient of thermal expansion that is less than the first coefficient of thermal expansion to restrict expansion of the aperture to the second coefficient of thermal expansion.

17 Claims, 4 Drawing Sheets

(56)                    References Cited

U.S. PATENT DOCUMENTS

| | | | | |
|---|---|---|---|---|
| 2015/0376864 A1* | 12/2015 | Choi | ..................... | F16C 33/208 |
| | | | | 384/278 |
| 2019/0032709 A1* | 1/2019 | Newcomb | ................. | B32B 5/26 |
| 2021/0257894 A1* | 8/2021 | Zhong | ................. | H02K 11/215 |

FOREIGN PATENT DOCUMENTS

| | | | | | |
|---|---|---|---|---|---|
| DE | 102015107005 A1 | | 11/2015 | | |
| DE | 102018200309 A1 | * | 2/2019 | ............ | F16C 35/077 |
| DE | 102018204519 A1 | * | 9/2019 | ........... | H02K 5/1732 |
| DE | 102021107282 A1 | | 9/2021 | | |
| DE | 102020114341 A1 | * | 12/2021 | ............ | F16C 35/077 |
| WO | WO-2011020464 A1 | * | 2/2011 | ............ | F16C 33/043 |

OTHER PUBLICATIONS

Machine Translation of DE-102018200309-A1 (Year: 2019).*
Machine Translation of DE-102018204519-A1 (Year: 2019).*
Machine Translation of DE-102020114341-A1 (Year: 2021).*
German Office Action from counterpart DE1020241043598, dated Jan. 14, 2025.

* cited by examiner

SEGMENTED BEARING CARTRIDGE WITH LOCAL AND CONTROLLED THERMAL EXPANSION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a bearing interface assembly configured to accommodate different rates of thermal expansion of a bearing and a housing of an installation site.

Bearings are installed on a rotating shaft to help support the shaft and reduce friction between the shaft and its housing. The bearing allows the shaft to rotate freely while minimizing the amount of friction generated between the shaft and its housing. This helps to reduce wear and tear on the shaft and its housing, and can help extend the life of a machine including the shaft. In some applications, the bearing and the housing have different rates of thermal expansion.

SUMMARY

The present disclosure includes, in various features, a bearing interface assembly configured to accommodate different rates of thermal expansion of a bearing and a housing of an installation site. The bearing interface assembly includes: a metallic sleeve including an outer surface defining a groove and an inner surface defining an aperture configured to cooperate with the bearing, the metallic sleeve configured to expand at a first coefficient of thermal expansion; and a filament-wound composite overwrap seated within the groove of the metallic sleeve, the filament-wound composite overwrap configured to expand at a second coefficient of thermal expansion that is less than the first coefficient of thermal expansion to restrict expansion of the aperture to the second coefficient of thermal expansion.

In further features, the first coefficient of thermal expansion is equal a housing coefficient of thermal expansion of the housing at the installation site; and the second coefficient of thermal expansion is equal to a bearing coefficient of thermal expansion of the bearing.

In further features, the metallic sleeve is confined to the groove to permit areas of the metallic sleeve on opposite sides of the groove to expand at the first coefficient of thermal expansion.

In further features, the groove is defined by a first flange and a second flange, the second flange is longer than the first flange.

In further features, the filament-wound composite overwrap is recessed within the groove below an outermost portion of the outer surface.

In further features, the metallic sleeve is made of aluminum.

In further features, the metallic sleeve is made of magnesium.

In further features, the filament-wound composite overwrap includes at least one of the following: a carbon fiber, a glass fiber, a basalt fiber, a natural fiber, a liquid crystal polymer, and an ultra-high molecular weight polyethylene fiber.

In further features: the filament-wound composite overwrap includes at least one of a thermoset resin and a thermoplastic resin; the thermoset resin includes at least one of an epoxy, phenolic, and bismaleimide; and the thermoplastic resin includes at least one of polypropylene, nylon, polycarbonate, polyethylene, polyethylene ether ketone, and polyetherketone.

In further features, the metallic sleeve defines a slit configured to cooperate with a tab at an installation site to restrict rotation of the metallic sleeve.

In further features, the filament-wound composite overwrap is wound onto the outer surface at an angle that is non-orthogonal to a longitudinal axis of the metallic sleeve and at a varying thickness in a direction parallel to the longitudinal axis.

In further features, the groove has a varying depth in a direction parallel to the longitudinal axis.

In further features, the filament-wound composite overwrap is secured to the outer surface by at least one of dry filament winding, wet filament winding, thermoplastic filament winding, tow winding, thermoset prepreg overwrapping and thermoplastic prepreg overwrapping.

The present disclosure further includes, in various features, a bearing interface assembly configured to accommodate different rates of thermal expansion of a bearing and a housing of an installation site. The bearing interface assembly includes: a metallic sleeve including a first flange and a second flange defining a groove therebetween at an outer surface of the metallic sleeve, the metallic sleeve further including an inner surface defining an aperture configured to cooperate with the bearing, the metallic sleeve and the housing configured to expand at a first coefficient of thermal expansion; and a filament-wound composite overwrap seated within the groove of the metallic sleeve, the filament-wound composite overwrap and the bearing configured to expand at a second coefficient of thermal expansion that is less than the first coefficient of thermal expansion to restrict expansion of the aperture to the second coefficient of thermal expansion without restricting expansion of the first flange and the second flange at the first coefficient of thermal expansion.

In further features, the groove defines a dove-tail shape in cross-section.

In further features, the metallic sleeve is made of at least one of aluminum and magnesium.

In further features, the filament-wound composite overwrap includes at least one of the following: a carbon fiber, a glass fiber, a basalt fiber, a natural fiber, a liquid crystal polymer, and an ultra-high molecular weight polyethylene fiber.

In further features, the filament-wound composite overwrap includes at least one of a thermoset resin and a thermoplastic resin; the thermoset resin includes at least one of an epoxy, phenolic, and bismaleimide; and the thermoplastic resin includes at least one of polypropylene, nylon, polycarbonate, polyethylene, polyethylene ether ketone, and polyetherketone.

The present disclosure further includes, in various features, a bearing interface assembly configured to accommodate different rates of thermal expansion of a bearing and a housing of an installation site. The bearing interface assembly includes: a metallic sleeve including a first flange and a second flange defining a groove therebetween at an outer surface of the metallic sleeve, the metallic sleeve further including an inner surface defining an aperture configured to cooperate with the bearing, the metallic sleeve and the housing configured to expand at a first coefficient of thermal expansion; and a filament-wound composite overwrap seated within the groove of the metallic sleeve, the filament-wound composite overwrap and the bearing configured to expand at a second coefficient of thermal expansion that is less than the first coefficient of thermal expansion to restrict expansion of the aperture to the second coefficient of thermal expansion without restricting expansion of the first flange and the second flange at the first coefficient of thermal expansion. The metallic sleeve is made of at least one of aluminum and magnesium. The filament-wound composite overwrap includes at least one of the following: a carbon fiber, a glass fiber, a basalt fiber, a natural fiber, a liquid crystal polymer, and an ultra-high molecular weight poly-ethylene fiber. The filament-wound composite overwrap is secured to the outer surface by at least one of dry filament winding, wet filament winding, thermoplastic filament winding, tow winding thermoset prepreg overwrapping and thermoplastic prepreg overwrapping.

In further features, the filament-wound composite over-wrap includes at least one of a thermoset resin and a thermoplastic resin; the thermoset resin includes at least one of an epoxy, phenolic, and bismaleimide; and the thermo-plastic resin includes at least one of polypropylene, nylon, polycarbonate, polyethylene, polyethylene ether ketone, and polyetherketone.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying draw-ings, wherein.

In the drawings, reference numbers may be reused to identify similar and/or identical elements.

DETAILED DESCRIPTION

The present disclosure provides a bearing interface assembly configured to accommodate different rates of thermal expansion of a bearing and a housing of an installation site. The assembly includes a metallic sleeve defining an aperture for the bearing. The metallic sleeve is configured with a first coefficient of thermal expansion matching a housing coefficient of thermal expansion of the housing. A filament-wound composite overwrap is wrapped over the sleeve. The overwrap is configured with a second coefficient of thermal expansion that is less than the first coefficient of thermal expansion, and is equal to a bearing coefficient of thermal expansion of the bearing. The overwrap extends around the aperture of the metallic sleeve to restrict thermal expansion of the aperture to the second coefficient of thermal expansion matching the bearing, while portions of the metal-lic sleeve without the overwrap expand at the first coefficient of thermal expansion to maintain cooperation with the housing.

Figures 1, 2:
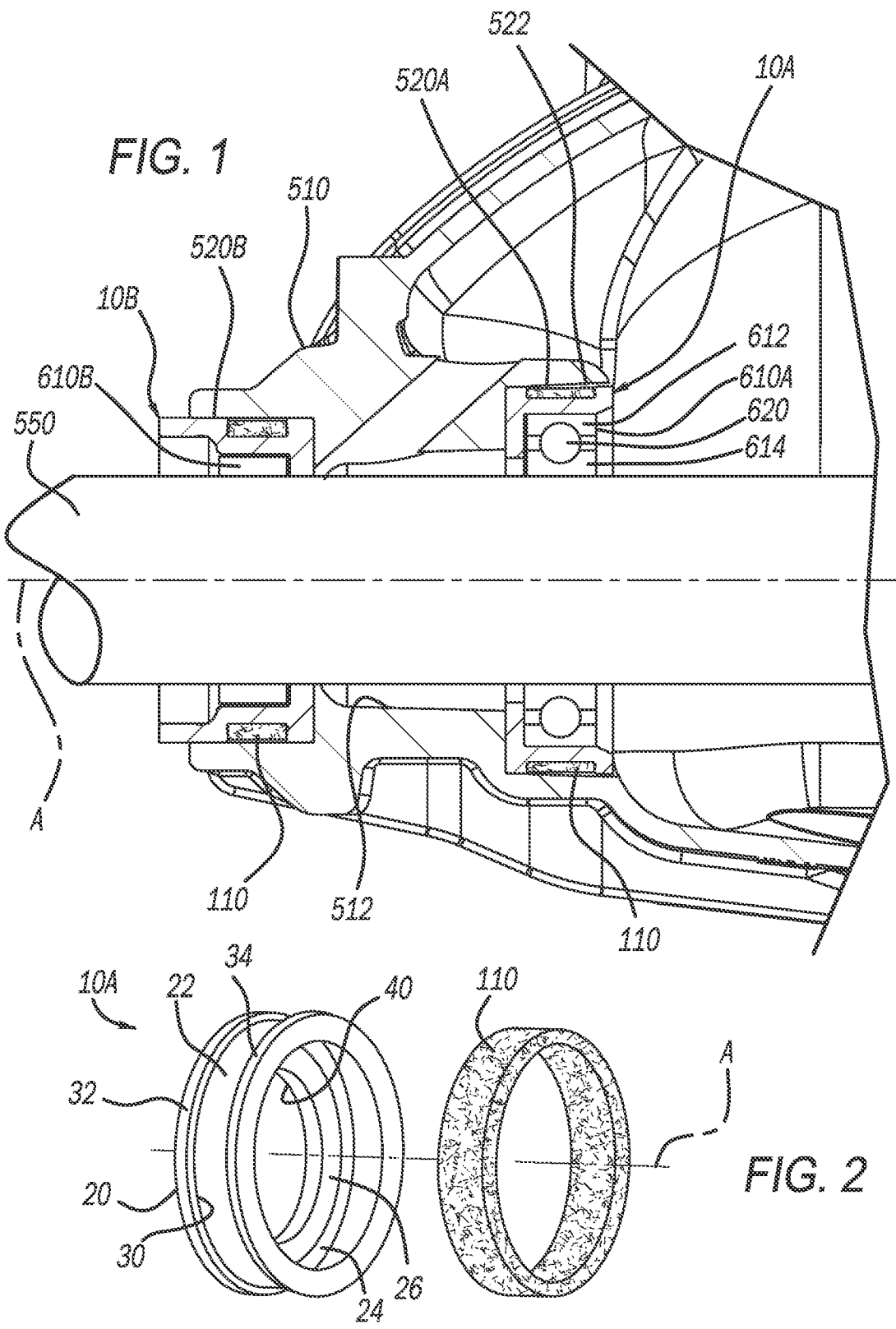
FIG. 1 is a cross-sectional view of an axle housing including two bearing interface assemblies in accordance with the present disclosure.
FIG. 2 is an exploded view of one of the bearing interface assemblies of the present disclosure.

FIG. 1 illustrates two bearing interface assemblies 10A, 10B in accordance with the present disclosure. The bearing interface assemblies 10A, 10B are installed in an exemplary housing 510, which in the example of FIG. 1 is a housing for a shaft 550, such as an axle shaft. The housing 510 defines a bore 512 through which the shaft 550 extends. A longitu-dinal axis A extends along an axial center of the shaft 550 and the bore 512. The housing 510 may be made of any suitable material, such as aluminum or magnesium, for example. The housing 510 expands at a first coefficient of thermal expansion, the exact rate of which will vary based on the material used for the housing 510.

The shaft 550 may be any rotating shaft of a vehicle, such as an axle shaft, an output shaft, a drive shaft, etc. The present disclosure is applicable to non-vehicular applica-tions as well. The shaft 550 may thus be a rotating shaft of any other suitable machine. For example, the shaft 550 may be a rotating shaft of a watercraft, aircraft, or powerplant, such as a wind turbine shaft, a hydroelectric turbine shaft, etc.

The bearing interface assembly 10A provides an interface between a bearing assembly 610A on the shaft 550 and a installation site 520A of the housing 510. The bearing assembly 610A includes an outer bearing race 612 in coop-eration with the bearing interface assembly 10A, an inner bearing race 614 in contact with the shaft 550, and a plurality of ball bearings 620 between the outer bearing race 612 and the inner bearing race 614. The bearing assembly 610A may thus be a ball bearing assembly, or any other suitable type of bearing. The bearing interface assembly 10B provides an interface between a bearing assembly 610B and the housing 510 at a second installation site 520B of the housing 510. The bearing assembly 610B is similar to the bearing assem-bly 610A. In the example of FIG. 1, the bearing assembly 610A is a head bearing, and thus the bearing interface assembly 10A is configured as a head bearing interface. The bearing assembly 610B is configured as a tail bearing, and thus the bearing interface assembly 10B is configured as a tail bearing interface.

The first installation site 520A is machined into the housing 510 to include a tapered surface 522. The bearing interface assembly 10A is press fit into a round bore at a bottom of (i.e., an innermost area of) the tapered surface 522 that interfaces with the flange 32 to secure the bearing interface assembly 10A at the first installation site 520A. The flange 34 may be taller than the flange 32 to facilitate retention of the assembly 10A at the first installation site 520A and to accommodate expansion of the flange 34 into cooperation with the housing 510. Likewise, the bearing interface assembly 10B may be press fit into the second installation site 520B, and may be otherwise retained at the second installation site 520B in any suitable manner with any suitable mechanical interlock.

With additional reference to FIGS. 2 and 3, the bearing interface assembly 10A will now be described in additional detail. The bearing interface assembly 10A includes a metallic sleeve 20, which defines an aperture 40. When installed at the first installation site 520A, the shaft 550 extends through the aperture 40. The longitudinal axis A of the shaft 550 extends through an axial center of the aperture 40.

The metallic sleeve 20 includes an outer surface 22 and an inner surface 24, which is opposite to the outer surface 22. At the outer surface 22, the metallic sleeve 20 defines a groove 30. The groove 30 is between a first flange 32 and a second flange 34 of the metallic sleeve 20. The outer surface 22 of the metallic sleeve includes outer surfaces of the first flange 32 and the second flange 34. The inner surface 24 is in contact with the outer bearing race 612 of the first bearing assembly 610A. Adjacent to the inner surface 24 is a sidewall 26 of the metallic sleeve 20 against which the outer bearing race 612 is seated.

The metallic sleeve 20 may be made of any suitable metallic material, such as aluminum or magnesium, for example. The metallic sleeve 20 is typically made of the same material that the housing 510 is made of to provide the metallic sleeve with a first coefficient of thermal expansion, which is the same as, or similar, to a coefficient of thermal expansion of the housing 510.

The bearing interface assembly 10A further includes a filament-wound composite overwrap 110. The filament-wound composite overwrap 110 extends around the metallic sleeve 20 on the outer surface within the groove 30. The overwrap 110 has a maximum T1 thickness that is less than, or equal to, a depth of the groove 30 so that the overwrap 110 does not protrude beyond the first flange 32 and the second flange 34. When installed at the first installation site 520A, the first flange 32 and the second flange 34 contact the housing 510.

Figures 3, 4, 5:
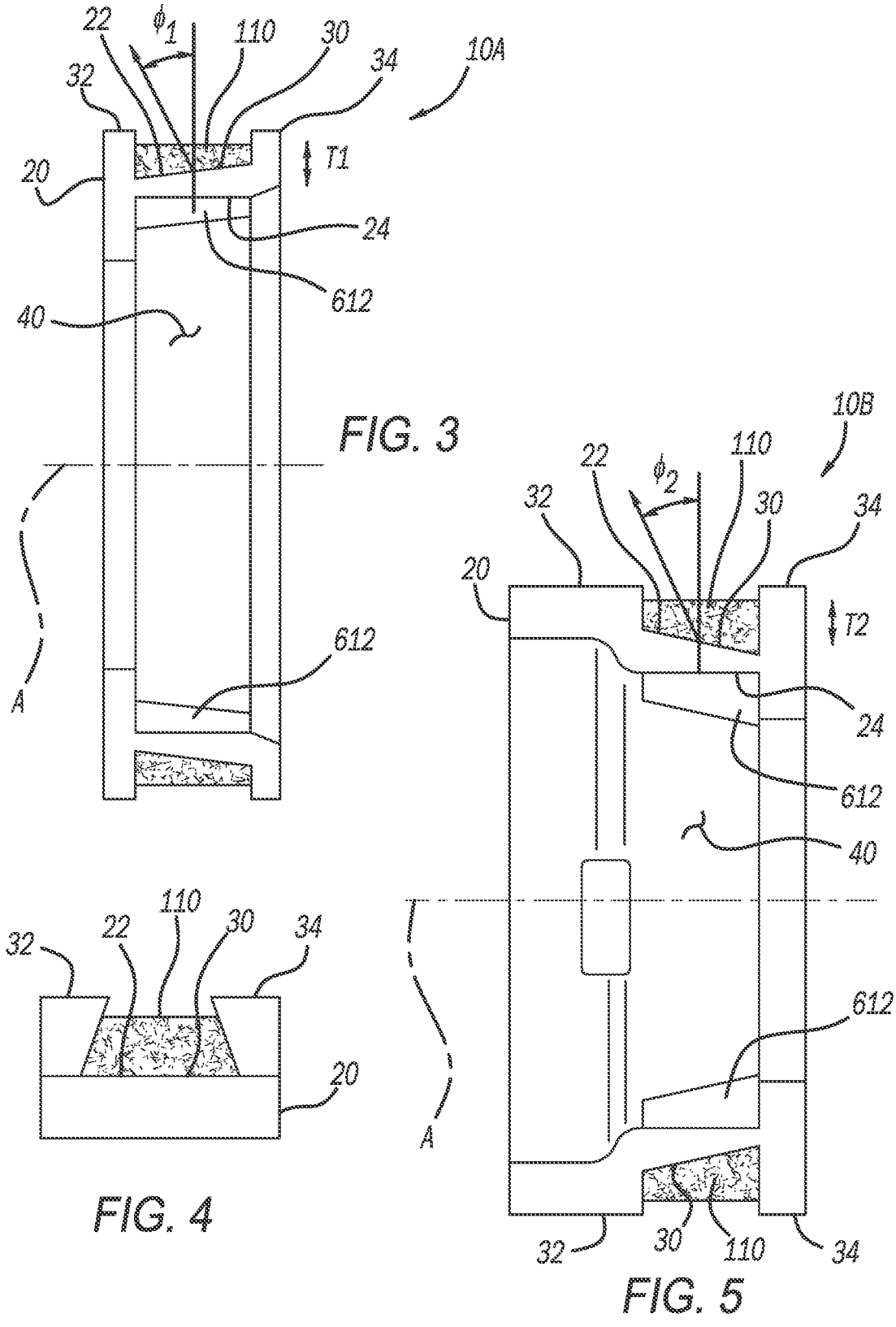
FIG. 3 is a cross-sectional view of the bearing interface assembly of FIG. 2.
FIG. 4 is a cross-sectional view of a dove-tail groove of one of the bearing interface assemblies of the present disclosure.
FIG. 5 is a cross-sectional view of another bearing inter-face assembly in accordance with the present disclosure.

In the example of FIG. 3, the groove 30 does not have a uniform depth, and the overwrap 110 is wound around the metallic sleeve 20 into the groove 30 at an angle θ1, which is nonorthogonal to the longitudinal axis A and the center axis of the aperture 40. The overwrap 110 has a non-uniform thickness, which generally mirrors a non-uniform thickness of the outer bearing race 612. Thus, a region of maximum thickness of the overwrap 110 is opposite to a region of maximum thickness of the outer bearing race 612, and a thinnest region of the overwrap 110 is opposite to a thinnest region of the outer bearing race 612. In other applications, such as illustrated in FIG. 1, the groove 30 may have a uniform depth, and thus the overwrap 110 may have a uniform thickness. With reference to FIG. 4, the groove 30 may have angled sidewalls to provide the groove with a dove-tail shape in cross-section. The dove-tailed sidewalls are configured to further secure the overwrap 110 within the groove 30.

The filament-wound composite overwrap 110 is configured with a second coefficient of thermal expansion, which is less than the first coefficient of thermal expansion of the metallic sleeve 20. The second coefficient of thermal expansion is equal to, or approximately equal to, a coefficient of thermal expansion of the first bearing assembly 610A (Likewise, the overwrap 110 is configured with a second coefficient of thermal expansion that is equal to, or approximately equal to, a coefficient of thermal expansion of the second bearing assembly 610B). The overwrap 110 constrains thermal expansion of portions of the metallic sleeve 20 encompassed by the overwrap 110, which includes the aperture 40.

Thus, the aperture 40 will expand at the same rate as the first bearing assembly 610A. The overwrap 110 does not constrain thermal expansion of the first and second flanges 32, 34, thereby allowing the first and second flanges 32, 34 to expand at the first coefficient of thermal expansion.

The filament-wound composite overwrap 110 includes one or more of the following: carbon fibers; glass fibers; basalt fibers; natural fibers; a liquid crystal polymer; and an ultra-high molecular weight polyethylene fiber. The overwrap 110 further includes a thermal set or a thermoplastic. Exemplary thermal set materials include, but are not limited to, an epoxy, a phenolic and a bismaleimide. Exemplary thermoplastic materials include, but are not to, polypropylene, nylon, polycarbonate, polyethylene, polyethylene ether ketone (PEEK) and polyetherketone (PEK). The overwrap 110 is wrapped around the metallic sleeve 20 within the groove and secured to the outer surface 22 in any suitable manner, such as with dry or wet filament winding, thermoplastic filament winding or tow winding. The overwrap 110 may be cured onto the outer surface 22, which keeps the fiber of the overwrap 110 in tension after completion of the curing process.

When the metallic sleeve 20 is exposed to heat sufficient to cause the housing 510 and the first bearing assembly 610 to expand, the metallic sleeve 20 expands at the first coefficient of thermal expansion to maintain contact with the housing 510. Thus, the first flange 32 and the second flange 34 expand outward at the same rate as the housing 510. But, areas of the metallic sleeve 20 overwrapped with the filament-wound composite overwrap 110 are constrained by the overwrap 110 from expanding at the first coefficient of thermal expansion, and instead expand at the second coefficient of thermal expansion of the overwrap 110. Thus, areas of the metallic sleeve 20 surrounded by the overwrap 110, such as the aperture 40, expand at the same rate as the first bearing assembly 610A, which prevents any thermal expansion mismatch between the housing 510 and the first bearing assembly 610A to maintain the relative positioning between the metallic sleeve and the first bearing assembly 610A. This configuration enhances efficiency of the bearing assembly 610A and reduces the possibility of noise and vibration issues.

FIG. 5 illustrates another bearing interface assembly 10B in accordance with the present disclosure. The assembly 10B is generally similar to the first bearing interface assembly 10A and the features of the assembly 10B that are the same as, or similar to, features of the assembly 10A are identified in the figures with the same reference numerals. The description of the assembly 10A also applies to the assembly 10B with respect to the like features. The metallic sleeve 20 of the second bearing interface assembly 10B has a shape similar to the metallic sleeve 20 of the assembly 10A, but the sleeve 20 of the assembly 10B is slightly more elongated to correspond to the shape of the housing 510 at the second installation site 520B. Another difference between the assemblies 10A, 10B, is that the groove 30 of the bearing interface assembly 10B is slightly deeper. Also, the outer surface 22 of the groove 30 of the assembly 10B is sloped at angle θ2, which is greater than the angle θ1 of the assembly 10A. Thus, the overwrap 110 of the assembly 10B is wrapped at a steeper angle relative to the longitudinal axis A as compared to the angle at which the overwrap 110 is wrapped. The overwrap 110 of the assembly 10B is thicker than the overwrap 110 of the assembly 10A in order to accommodate the thicker outer bearing race 612 of the second bearing assembly 610B.

Figures 6, 7:
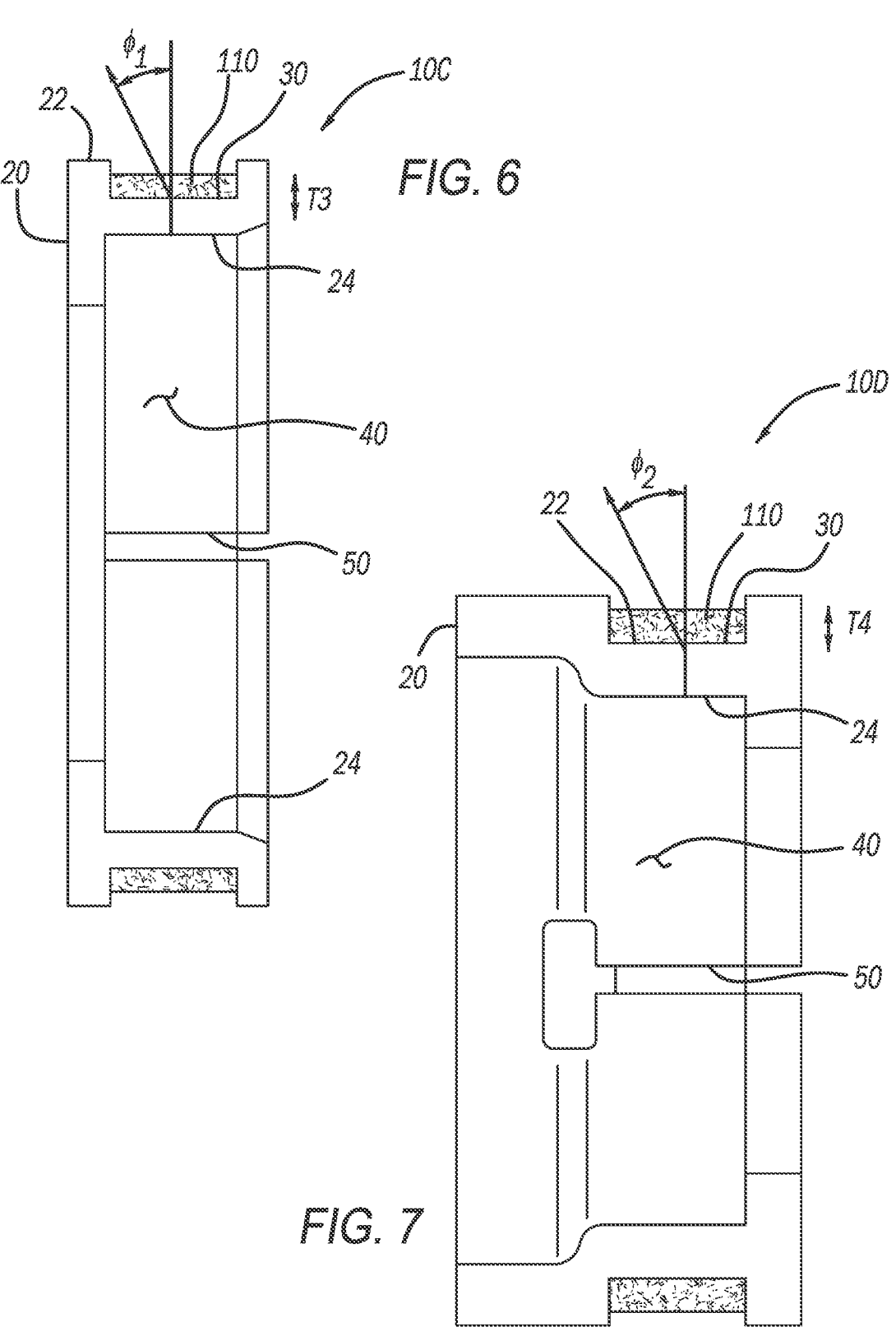
FIG. 6 is a cross-sectional view of a bearing interface assembly of the present disclosure defining a slit configured to cooperate with a tab at an installation site to restrict rotation of the bearing interface assembly.
FIG. 7 is cross-sectional view of an additional bearing interface assembly of the present disclosure defining another slit configured to cooperate with a tab to restrict rotation of the bearing assembly.

With reference to FIG. 6, the present disclosure provides for an additional bearing interface assembly 10C, which is similar to the bearing interface assembly 10A. Unlike the assembly 10A, the assembly 10C defines a slit 50. The slit 50 is configured to cooperate with any suitable tab, knob, etc. of the first installation site 520A to restrict rotation of the assembly 10C. Also, the groove 30 of the assembly 10C has a uniform depth, and thus the overwrap 110 has a uniform thickness T3 around the metallic sleeve 20.

FIG. 7 illustrates an additional bearing interface assembly 10D in accordance with the present disclosure. The assembly 10D is similar to the assembly 10B, and thus the same reference numerals are used to identify the features that are the same or substantially similar. Unlike the assembly 10B, the assembly 10D defines a slit 50, which is configured to cooperate with any suitable tab, knob, etc. of the second installation site 520B to prevent rotation of the assembly 10D when installed at the second installation site 520B. Also, the groove 30 of the assembly 10D has a uniform depth, and thus the overwrap 110 has a uniform thickness T4 around the metallic sleeve 20. The thickness T4 of the overwrap 110 is greater than the thickness T3 of FIG. 5.

In addition to preventing rotation, the slits 50 also facilitate installation of the assemblies 10C and 10D. The slits 50 are configured to allow the metal of the metallic sleeve 20 to flex slightly and allow a slip fit of the bearing assemblies 610A, 610B into the metallic sleeves 20 before the overwrap 110 is applied. When placing the bearing assemblies 610A, 610B into the metallic sleeves 20, flanges of the metallic sleeves 20 bend allowing the bearing assemblies 610A, 610B to be easily pushed into the metallic sleeves 20. The metallic sleeves 20 are then wrapped with the overwraps 110 and the bearing assemblies 610A, 610B are locked in place from the pressure exerted inward by the composite overwrap 110

Figure 8:
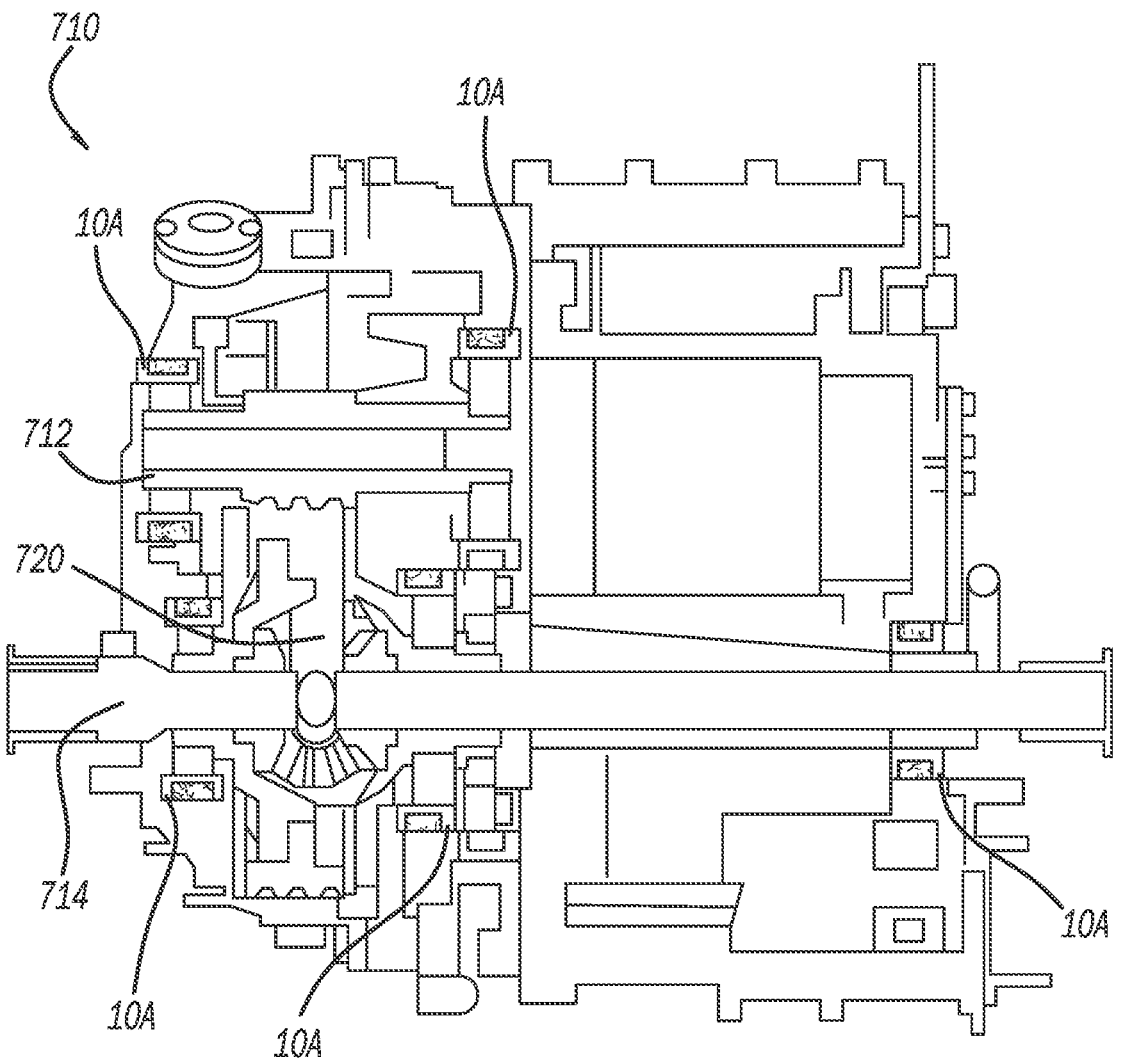
FIG. 8 is a cross-sectional view of a motor including bearing interface assemblies in accordance with the present disclosure.

FIG. 8 illustrates another application for the bearing interface assemblies 10A-10D of the present disclosure. FIG. 8 illustrates an exemplary motor 710 including an output shaft 712 and a drive shaft 714. The output shaft 712 is connected to the drive shaft 714 by any suitable gear reduction 720. The output shaft 712 extends through two of the bearing interface assemblies 10A. The drive shaft 714 extends through three of the bearing interface assemblies 10A. Although FIG. 7 illustrates the motor 710 including the bearing interface assemblies 10A, any of the other bearing interfaces assemblies 10B-10D may be included instead of, or in addition to, the assemblies 10A.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A bearing interface assembly configured to accommodate different rates of thermal expansion, the bearing interface assembly comprising:

a metallic sleeve including an outer surface defining a groove and an inner surface defining an aperture, the metallic sleeve configured to expand at a first coefficient of thermal expansion; and a filament-wound composite overwrap seated within the groove of the metallic sleeve, the filament-wound composite overwrap configured to expand at a second coefficient of thermal expansion that is less than the first coefficient of thermal expansion to restrict expansion of the aperture to the second coefficient of thermal expansion;

wherein the filament-wound composite overwrap is wound onto the outer surface at an angle that is non-orthogonal to a longitudinal axis of the metallic sleeve and at a varying thickness in a direction parallel to the longitudinal axis; and wherein the groove has a continuously varying depth in a direction parallel to the longitudinal axis, and the groove has a maximum groove width equal to a width of the filament-wound composite overwrap.

2. The bearing interface assembly of claim 1, wherein the filament-wound composite overwrap is confined to the groove to permit areas of the metallic sleeve on opposite sides of the groove to expand at the first coefficient of thermal expansion.

3. The bearing interface assembly of claim 1, wherein the groove is defined by a first flange and a second flange, the second flange is longer than the first flange.

4. The bearing interface assembly of claim 1, wherein the filament-wound composite overwrap is recessed within the groove below an outermost portion of the outer surface.

5. The bearing interface assembly of claim 1, wherein the metallic sleeve is made of aluminum.

6. The bearing interface assembly of claim 1, wherein the metallic sleeve is made of magnesium.

7. The bearing interface assembly of claim 1, where the filament-wound composite overwrap includes at least one of the following: a carbon fiber, a glass fiber, a basalt fiber, a natural fiber, a liquid crystal polymer, and an ultra-high molecular weight polyethylene fiber.

8. The bearing interface assembly of claim 1, wherein:
the filament-wound composite overwrap includes at least one of a thermoset resin and a thermoplastic resin;
the thermoset resin includes at least one of an epoxy, phenolic, and bismaleimide; and
the thermoplastic resin includes at least one of polypropylene, nylon, polycarbonate, polyethylene, polyethylene ether ketone, and polyetherketone.

9. The bearing interface assembly of claim 1, wherein the metallic sleeve defines a slit.

10. The bearing interface assembly of claim 1, wherein the filament-wound composite overwrap is secured to the outer surface by at least one of dry filament winding, wet filament winding, thermoplastic filament winding, tow winding, thermoset prepreg overwrapping, and thermoplastic prepreg overwrapping.

11. A bearing interface assembly configured to accommodate different rates of thermal expansion, the bearing interface assembly comprising:
a metallic sleeve including a first flange and a second flange defining a groove therebetween at an outer surface of the metallic sleeve, the metallic sleeve further including an inner surface defining an aperture, the metallic sleeve configured to expand at a first coefficient of thermal expansion; and
a filament-wound composite overwrap seated within the groove of the metallic sleeve, the filament-wound composite overwrap configured to expand at a second coefficient of thermal expansion that is less than the first coefficient of thermal expansion to restrict expansion of the aperture to the second coefficient of thermal expansion without restricting expansion of the first flange and the second flange at the first coefficient of thermal expansion;
wherein the filament-wound composite overwrap is wound onto the outer surface at an angle that is non-orthogonal to a longitudinal axis of the metallic sleeve and at a varying thickness in a direction parallel to the longitudinal axis; and
wherein the groove has a continuously varying depth in a direction parallel to the longitudinal axis, and the groove has a maximum groove width equal to a width of the filament-wound composite overwrap.

12. The bearing interface assembly of claim 11, wherein the groove defines a dove-tail shape in cross-section.

13. The bearing interface assembly of claim 11, wherein the metallic sleeve is made of at least one of aluminum and magnesium.

14. The bearing interface assembly of claim 13, wherein the filament-wound composite overwrap includes at least one of the following: a carbon fiber, a glass fiber, a basalt fiber, a natural fiber, a liquid crystal polymer, and an ultra-high molecular weight polyethylene fiber.

15. The bearing interface assembly of claim 14, wherein:
the filament-wound composite overwrap includes at least one of a thermoset resin and a thermoplastic resin;
the thermoset resin includes at least one of an epoxy, phenolic, and bismaleimide; and
the thermoplastic resin includes at least one of polypropylene, nylon, polycarbonate, polyethylene, polyethylene ether ketone, and polyetherketone.

16. A bearing interface assembly configured to accommodate different rates of thermal expansion, the bearing interface assembly comprising:
a metallic sleeve including a first flange and a second flange defining a groove therebetween at an outer surface of the metallic sleeve, the metallic sleeve further including an inner surface defining an aperture, the metallic sleeve configured to expand at a first coefficient of thermal expansion; and
a filament-wound composite overwrap seated within the groove of the metallic sleeve, the filament-wound composite overwrap configured to expand at a second coefficient of thermal expansion that is less than the first coefficient of thermal expansion to restrict expansion of the aperture to the second coefficient of thermal expansion without restricting expansion of the first flange and the second flange at the first coefficient of thermal expansion,
wherein:
the metallic sleeve is made of at least one of aluminum and magnesium;
the filament-wound composite overwrap includes at least one of the following: a carbon fiber, a glass fiber, a basalt fiber, a natural fiber, a liquid crystal polymer, and an ultra-high molecular weight polyethylene fiber;
the filament-wound composite overwrap is wound onto the outer surface at an angle that is non-orthogonal to a longitudinal axis of the metallic sleeve and at a varying thickness in a direction parallel to the longitudinal axis;
the filament-wound composite overwrap is secured to the outer surface by at least one of dry filament winding, wet filament winding, thermoplastic filament winding, tow winding, thermoset prepreg overwrapping and thermoplastic prepreg overwrapping; and
the groove has a continuously varying depth in a direction parallel to the longitudinal axis, and the groove has a maximum groove width equal to a width of the filament-wound composite overwrap.

17. The bearing interface assembly of claim 16, wherein:
the filament-wound composite overwrap includes at least one of a thermoset resin and a thermoplastic resin;
the thermoset resin includes at least one of an epoxy, phenolic, and bismaleimide; and
the thermoplastic resin includes at least one of polypropylene, nylon, polycarbonate, polyethylene, polyethylene ether ketone, and polyetherketone.

* * * * *